Nov. 21, 1944. J. M. ROPER 2,363,147
AIRPLANE LANDING LIGHT LAMP RETAINING RING
Filed Sept. 24, 1943
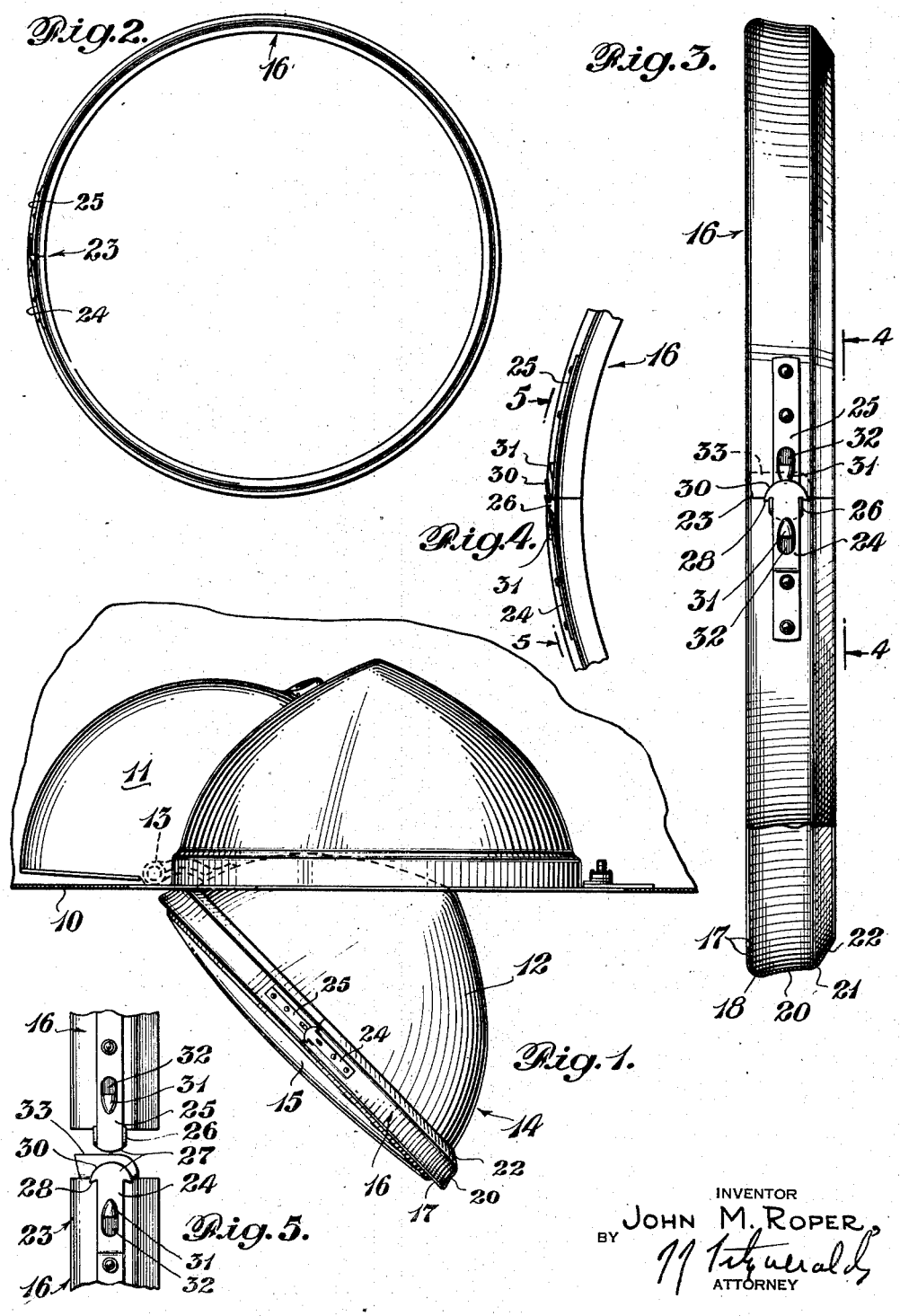
INVENTOR
JOHN M. ROPER,
BY
ATTORNEY Patented Nov. 21, 1944

2,363,147

UNITED STATES PATENT OFFICE 2,363,147

AIRPLANE LANDING LIGHT LAMP RETAINING RING

John M. Roper, Washington, D. C.

Application September 24, 1943, Serial No. 503,600

3 Claims. (Cl. 240—41.55)

(Granted under the act of March 3, 1883, as amended April 30, 1928; 370 O. G. 757)

This invention relates to a lamp lens retaining ring and has for an object to provide an improved means of retaining or holding a lamp, particularly of the so-called "sealed-beam" type in a vehicle light, and particularly, in an airplane landing light of the type that may be retracted into the wing or body of the airplane when not in use.

A further object of this invention is to provide a means for securing the lamp in its retractable canopy that is streamlined.

A further object of this invention is to provide a securing means for retaining the lamp in its canopy that may be applied or removed quickly and easily, thus facilitating the replacement of the lamp when it is burnt out or damaged.

Still a further object of this invention is to provide a retaining ring that needs only a single tool, such as a pair of sharp nose pliers, for applying it as well as for detaching it.

With the foregoing and other objects in view, the invention consists in the construction, combination and arrangement of parts hereinafter described and illustrated in the drawing, in which:

Fig. 1 is an elevational view of the retaining ring of this invention as applied in operative position;

Fig. 2 is an edge elevational view of the ring;

Fig. 3 is a side view on an enlarged scale;

Fig. 4 is a broken detail view at arrows 4—4 of Fig. 3; and

Fig. 5 is a broken detail view at arrows 5—5 of Fig. 4.

There is shown at 10 the bottom skin of an airplane wing in which is recessed a bracket 11 within which is hinged at 13 the canopy 12 forming part of a retractable landing headlight 14. This landing light 14 includes a "sealed-beam" type of lamp whose lens 15 is secured to the lamp canopy 12 by means of the retaining ring 16 constituting this invention.

This retaining ring 16 consists of an annular front flange 17 extending from the rounded off edge 18 of a slightly receding concave annulus 20 connected by a rounded edge 21 to a beveled rear flange 22. This ring 16 is provided with a separable joint 23 having a male clip 24 and female clip 25 for detachably securing the joint edges together. Each of the clips may be identical as originally stamped out, and the female clip 25 is formed by bending the wings 26 of the head 27 forwardly at right angles so that the wings 28 of the head 30 of the male clip 24 may be seated therebehind and be held in position by the tension in the ring. Both clips are riveted in proper position on the opposite side of the joint 23 in the ring 16, and each is provided with an extruded nub 31 ahead of an aperture 32 for receiving the prongs of a pair of sharp nose pliers for pulling the clips toward each other in engaging or disengaging the joint 23. A depressed tongue 33 is formed on one side of the joint 23 and is overlapped by the other side of the joint when in closed position to insure a tight fit.

In operation, the lamp and its lens 15 are placed in the canopy 12 in the customary manner, with the annular edge of the lens adjacent the annular edge of the canopy which canopy edge may be beaded. The ring 16, with its joint separated, is then placed over the adjacent edges of the canopy and lamp lens with the ring front flange 17 extending over the edge of the lamp lens 15 and the rear beveled edge 22 of the ring extending over the edge of the canopy. A pair of sharp nose pliers is then used to grip the nubs 31 and pull the ends of the ring 16 together until the male clip 24 has its wings 28 caught behind the bent up wings 26 of the female clip, thus holding the ring 16 and the lamp 15 secured to the canopy 12. To remove the lamp lens 15, the same sharp nose pliers are used, squeezing the nubs 31 toward each other until the clips are disengaged, permitting the ring and then the lens and lamp to be removed.

While the ring 15 is herein described as a lamp lens retaining ring, it will be understood that the ring 15 is not limited to being used with a lamp 15 of the "sealed-beam" type, but that it may also be used with equal facility with conventional types of lights where the lamp is separate from the lens, and the member 15 represents the lens of the lamp, whether integral therewith or separate therefrom.

Other modifications and changes in the number and arrangement of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

What is claimed is:

1. A lamp lens retaining ring comprising an annulus, concave in cross section, both edges of the annulus being rounded, a flange extending inwardly from each rounded edge of the annulus, the flange from one edge being substantially in one plane, the flange from the other edge being beveled at an angle to the annulus, and a securing joint formed in said annulus, said joint including a tongue on one end of the joint adapted to underlie the other end of the joint, a male clip riveted on one end, a female clip on the other end and a raised nub on each clip adapted to cooperate with a tool for engaging or disengaging the male and female clips.

2. A lamp lens retaining ring comprising an annulus, concave in cross section, a flange extending inwardly from each edge of the annulus, a securing joint formed in said annulus, said joint including a tongue on one end of the joint adapted to underlie the other end of the joint, a male clip riveted on one end, a female clip on the other end and a raised nub on each clip adapted to cooperate with a tool for engaging or disengaging the male and female clips, each clip consisting of an extending head and side wings thereon, the wings of the female clip being bent upwardly to engage behind the wings of the male clip in engaging position.

3. A lamp lens retaining ring comprising an annulus, concave in cross section, the diameter of one edge of the annulus being slightly less than the diameter of the other edge of the annulus, both edges being rounded, a flange extending inwardly from each rounded edge of the annulus, the flange from the large diametered edge being substantially in one plane, the flange from the smaller diametered edge being beveled at an angle to the annulus, a securing joint formed in said annulus, said joint including a tongue on one end of the joint adapted to underlie the other end of the joint, a male clip riveted on one end, a female clip on the other end and a raised nub on each clip adapted to cooperate with a tool for engaging or disengaging the male and female clips, each clip consisting of an extending head and side wings thereon, the wings of the female clip being bent upwardly to engage behind the wings of the male clip in engaging position.

JOHN M. ROPER.